J. REECE.
VARIABLE SPEED TRANSMITTER.
APPLICATION FILED JAN. 20, 1914.

1,181,167.

Patented May 2, 1916.
3 SHEETS—SHEET 1.

Witnesses:
E. P. Bernhardt
M. Tucker

Inventor:
John Reece,
by Rogers, Kennedy & Campbell
his Attys.

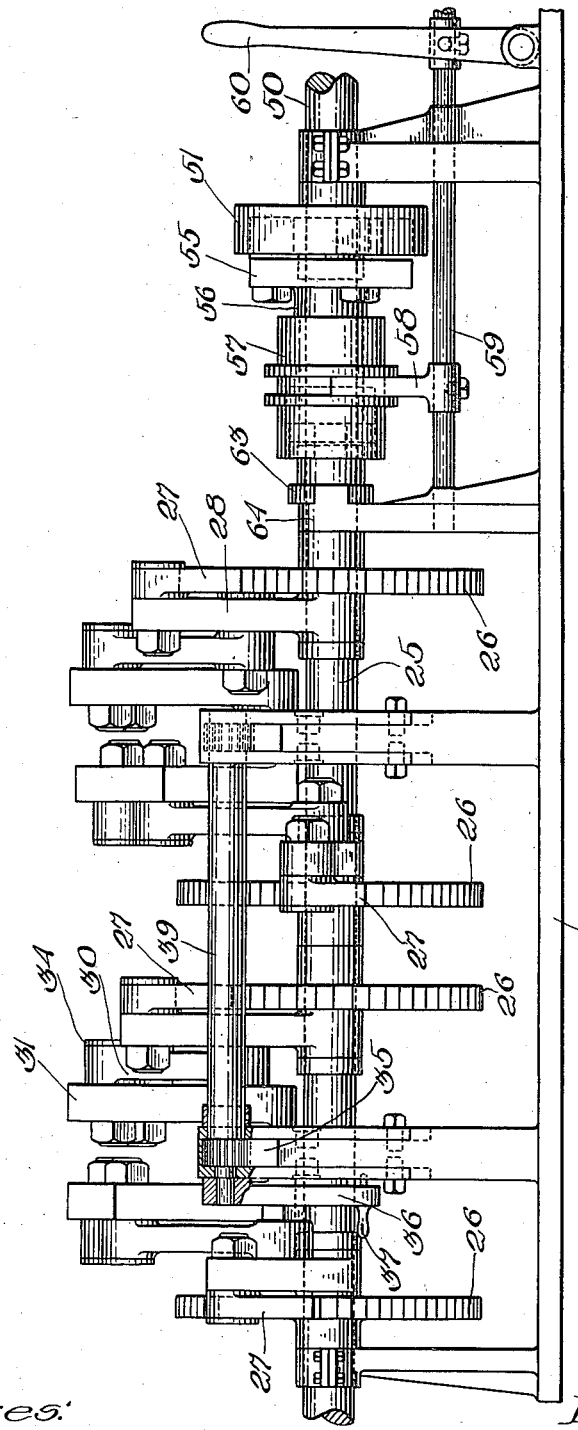

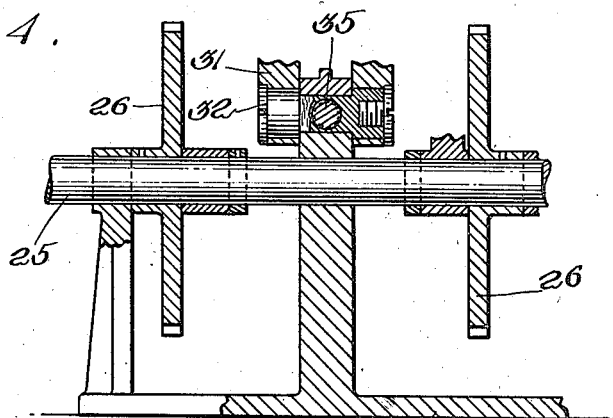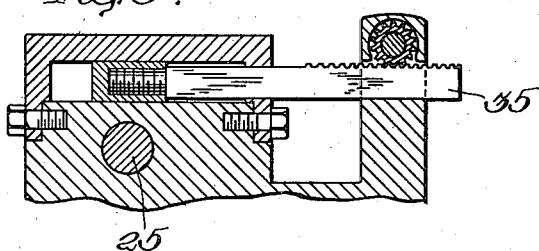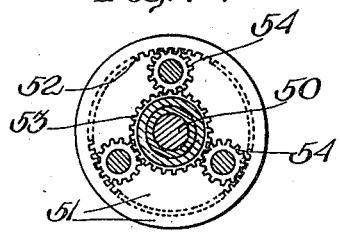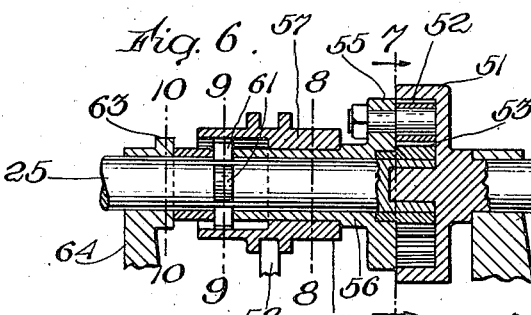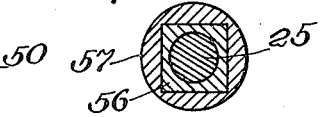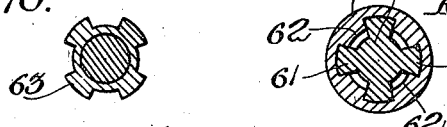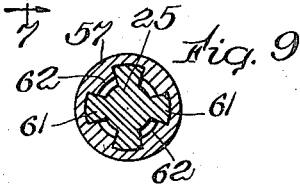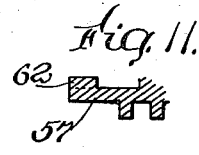

UNITED STATES PATENT OFFICE.

JOHN REECE, OF MANCHESTER, MASSACHUSETTS.

VARIABLE-SPEED TRANSMITTER.

1,181,167.  Specification of Letters Patent.  Patented May 2, 1916.

Application filed January 20, 1914. Serial No. 813,177.

*To all whom it may concern:*

Be it known that I, JOHN REECE, a citizen of the United States, residing at Manchester, in the county of Essex and State of Massachusetts, have invented certain new and useful Improvements in Variable-Speed Transmitters, of which the following is a specification, reference being had therein to the accompanying drawing.

This invention relates to variable speed transmitter and more particularly to mechanism for transmitting the motion of a rotary driving shaft to a rotary driven shaft with provision for varying the speed ratio. The two shafts may, for example, be respectively connected to the engine and to the wheels of a motor vehicle, the mechanism hereof permitting the speed of the vehicle to be controlled.

Generally the object hereof is to afford an improved and simplified variable speed transmitter mechanism possessing good efficiency of transmission, easily adjustable for varying speed ratio, capable of giving any desired ratio between the extreme limits, capable of reversing the driven shaft and free from the structural weaknesses and other objections of heretofore known mechanisms.

To the attainment of this and other objects, the present improvement consists in the novel combinations, mechanisms, devices, arrangements and details hereinafter referred to or illustrated in the accompanying drawings.

First will be described an illustrative mechanism in which the present improvement may be embodied and thereafter the novel features will be set forth in the claim.

Figure 1:
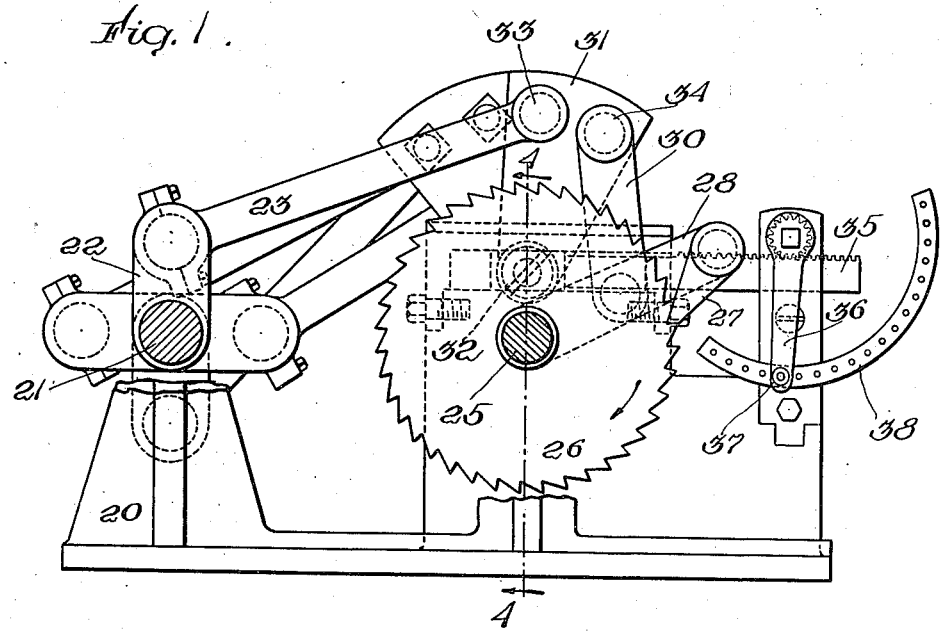
Figure 2:
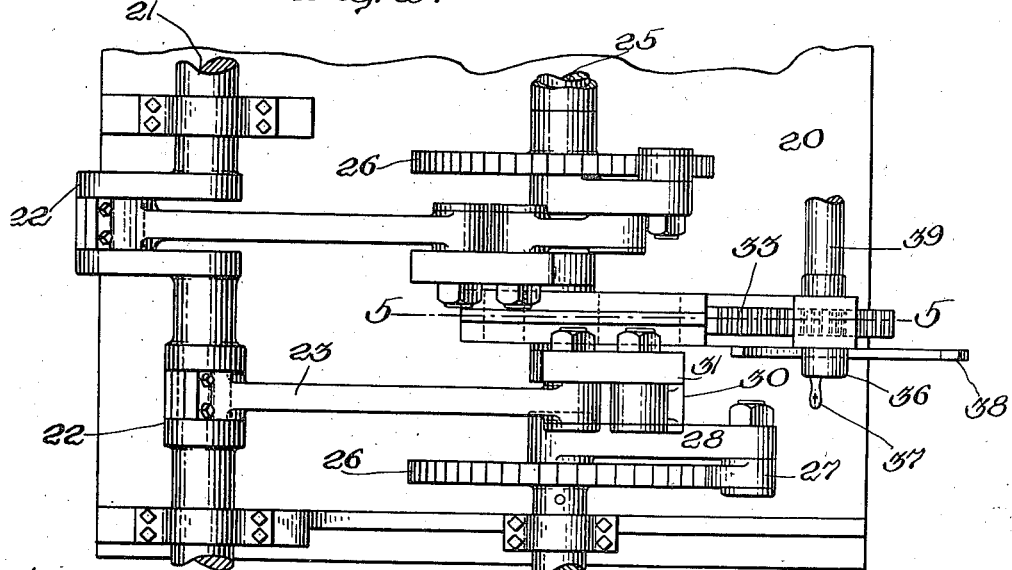

In the accompanying drawings forming a part hereof, Figure 1 may be considered an end elevation of a variable speed transmission mechanism embodying the present invention; Fig. 2 is a top plan view of the parts shown in Fig. 1; Fig. 3 is a right elevation of the parts shown in Figs. 1 and 2; Fig. 4 is a vertical section upon the plane 4—4 of Fig. 1; Fig. 5 is a vertical section on the plane 5—5 of Fig. 2; Figs. 6 to 11 show the details of the reversing mechanism, Fig. 6 being a vertical central section of the parts at the right hand of Fig. 3; while Figs. 7, 8, 9 and 10 are cross sections taken respectively on the planes 7—7, 8—8, 9—9 and 10—10 of Fig. 6. Fig. 11 shows a structural detail of parts seen in Figs. 6 and 9.

The same reference numerals designate corresponding parts in the several figures of the drawings.

The combination illustrated in the drawings includes, besides the two shafts, one of them being a crank shaft, connections between the shafts of such nature that by adjustment the motion of one shaft may be communicated at various speeds to the other. Specifically there is an intermediate swinging member reciprocated from the crank shaft and connected to the driven shaft and itself adjustable; for example, in position, so as to secure the desired speed adjustment. By thus confining the adjustment to an intermediate part it is unnecessary to interrupt the continuity or weaken the strength of either shaft. A motion reversing means for the driven shaft is shown wholly unassociated with the connections between the two shafts so that the driving and reversing functions are segregated.

Referring specifically to the drawings, the frame or base 20 is provided with suitable journals for the crank shaft 21 which preferably constitutes the driving shaft of the present invention. The driving shaft 21 has the crank 22 of usual or suitable type, and may have other cranks as many as desired, preferably relatively angularly spaced so as to operate alternately in propelling the driven parts. Extending from each crank 22 is a connecting rod 23.

The driven shaft 25 is shown mounted parallel to the driving shaft corresponding to each of the cranks 22. The driven shaft may have a disk 26 adapted to be intermittently advanced by a reciprocating gripper 27. For convenience of illustration the disk 26 is shown as a toothed or ratchet wheel and the gripper 27 as a pawl adapted to engage the teeth at each forward stroke and thereby impel the driven shaft. In order that the pawl may reciprocate concentrically, it is mounted at the extremity of an arm or carrier 28 which is loosely fitted to the driven shaft. If, now, the connecting rod 23 were jointed directly at its two ends to the driving crank 22 and the gripper carrier 28, a certain driving action would be obtained but the speed ratio would not be adjustable unless some expedient complicating and perhaps weakening the driving crank shaft were introduced. Such a construction would be contrary to the present improvement.

According to the present improvement a device is introduced between the connecting rod 23 and the gripper carrier 28 for communicating motion; and the speed ratio adjustment is effected by adjustment of this intermediate device. Such adjustment may be variously effected according to this improvement, thus the intermediate device might have an adjustable connection with the connecting rod 23 or with the carrier 28, or it might be itself adjustable. As an illustration of such a device, there is shown a combination of two parts 30 and 31 and these are relatively movable and capable of relative adjustment for the purposes referred to; for example, by constituting the part 31 a swinging member with adjustable pivot 32 and the part 30 a mere connecting link between the carrier 28 and member 31. Specifically, therefore, we have a combination with the driving crank and the gripper carrier of a connecting link from each, and a member 31 between them to which both links are pivoted.

Assuming, now, the pivot 32 of the swinging member 31 to be fixed in position, the driving crank 22 through connecting rod 23 reciprocates the member 31 and that, in turn, acting through the link 30, reciprocates the gripper carrier. The member 31 practically constitutes two connected arms, one extending from the pivot 32 to the pivotal point 33 of the rod 23, and the other from the pivot 32 to the pivotal point 34 of link 30 and when the proportions are designed, as shown, the entire member 31 may be constituted of a single segment, as shown, having adjacent pivotal connections to the rod and link.

Various modes of adjustment of the member 31 might effect adjustments of speed ratio, for example, if the length of the effective arms 32—33 and 32—34 were altered the throw of the carrier, and therefore the speed of the driven shaft, would be altered. Or the distance between pivots 33 and 34 might be adjusted. Herein the adjustment is shown as effected by shifting the position of the pivot 32 under proper control. To this end the pivot 32 is mounted on a block or slide 35 which is so arranged that on adjustment it may swing the effective arm 32—34 toward or from the link 30. For adjusting the block 35, it may be provided with a rack or teeth engaging a pinion rotated by adjusting lever 36, the handle 37 of which controls a pin which may be dropped into different apertures in an arc plate 38.

The operation is substantially that in the illustrated adjustment in Fig. 1, the driven shaft will have a given speed whereas by pushing the handle 37 toward the right the block 35 and pivot 32 are thereby adjusted to the right gradually reducing the speed until eventually the pivot 32 is brought into alinement with the pivotal connection between the carrier 28 and link 30 at which time obviously the swinging member 31 may reciprocate but without causing any motion of the carrier or pawl, so that the driving action ceases.

In the side elevation (Fig. 3) no attempt is made to illustrate the cranks, but it will be observed that the toothed disks 26 are four in number, arranged in pairs, and that the hand lever 36 in adjusting the block 35 for altering the throw of the pawl carriers for the first pair also rotates a rock shaft 39 which extends to the second pair of disks where the adjusting devices are duplicated. Consequently all of the pawl carriers are simultaneously adjusted to receive the same extent of throw, and they, therefore, operate consecutively in harmony to impel the driven shaft at a speed which is greater or less according to whether the throw is greater or less.

Fig. 4 shows how each sliding block 35 carries the pivots 32 for both of a pair of adjacent swinging members 31. Fig. 5 shows details of the structure for mounting the block 35.

In some cases, and if desired, there may be introduced a yielding element between the driving crank 22 and the driven shaft 25 so that uniform motion of the driven shaft may be harmonized with non-uniform motion of the reciprocating driving parts, for example, the swinging member 31 might be constituted of two relatively movable parts or arms held strongly in or near their proper normal relative position by a powerful spring.

For securing reversal of motion when that is desired the driven shaft may be formed with a separate shaft section 50 in alinement with the driven shaft 25 and any type of reversing gear introduced between them, such, for example, as a sun-and-planet gear as shown in Figs. 1 and 6 to 11. Secured at the end of the shaft 50 is a cylindrical gear case 51 interiorly toothed at 52. Opposed to the teeth 52 are teeth 53 on the shaft 25. Intermediate the gear 53 and the internal gear 52 are the planet gears 54 and they are all mounted on studs secured to a flange 55 of a hub 56 surrounding the shaft 25. Whenever the hub 56 is locked to the shaft 25, the gears 52, 53, 54 are locked and the shaft 50 rotates as though rigid with the shaft 25. When the hub 56 is held, the rotation of shaft 25 causes the reverse rotation of shaft 50. To effect these adjustments the following mechanism may be employed: Surrounding the squared portion of the hub 56 (see Fig. 8) is a sleeve 57 longitudinally adjustable by means of a yoke 58 (see Fig. 3) engaging between external collars on the sleeve, the yoke secured to a slide rod 59 moved longitudinally by handle 60. Longitudinal movement of the sleeve either locks hub to the shaft or renders it stationary. In the position shown the sleeve is locked to the shaft by reason of a set of four radial projections 61 from the shaft intermeshing with four corresponding inward projections 62 from the sleeve 57, as more clearly seen in the cross section Fig. 9. As seen in Fig. 6, the sleeve is annularly recessed from its left end nearly to its center and, as seen in Fig. 11, the inward projections 62 extend only for a short distance at the left extremity of the recess. In the present adjustment the projections 61 and 62 intermeshing, as in Fig. 9, effectually lock the shaft, sleeve and hub together for direct driving. If, however, the handle 60 and the sleeve 57 be thrown fully to the left, the sleeve projections 62 will disengage the shaft projection 61 and will engage with fixed projections 63 formed on a standard 64 seen at the left hand of Fig. 6. When in such adjustment the sleeve and hub are stationary and the sun-and-planet gear causes the reverse drive of shaft 50.

Broadly the illustrated combination includes the crank on the driving shaft, the reciprocable gripper coöperating with the disk portion of the driven shaft for intermittently impelling it, and reciprocating device intermediate the crank and the gripper adjustable for altering the gripper action. In using the term crank, it is intended to include any equivalent device on a shaft capable of giving reciprocating motion. Altering the gripper action according hereto changes the throw of the gripper and thereby changes its speed so as to alter the driven shaft speed. The device between the crank and the gripper includes the swinging member 31 which is adjustable and which swings about a pivot that is non-reciprocating but adjustably movable so as to shift the swinging member toward and from a position of coincidence with the link 30, so that the gripper action may be decreased or increased.

It will thus be seen that there has been described a variable speed transmitter accomplishing the recited objects and advantages and other advantages will be apparent to those acquainted with the art.

Since many matters of design, arrangement, detail and other features may be indefinitely varied without departing from the invention herein involved, no limitation to such features is intended excepting as specified in the appended claim.

What is claimed is:

Variable speed transmission mechanism including in combination, a driving shaft having a crank, a driven shaft, a reciprocable gripper coöperating with a portion of the driven shaft for intermittently impelling it, an oscillating carrier for said gripper, a pivoted swinging member, a connecting rod from said crank to said member, a link from said member to said carrier, said connecting rod and link being both pivoted directly to said member but at separated points, and means for adjusting the position of the pivot of said member to vary the action of said gripper on the driven shaft.

In testimony whereof I affix my signature in presence of two witnesses.

JOHN REECE.

Witnesses:
E. P. BERNHARDT,
WM. J. DOLAN.